United States Patent
Machida

(10) Patent No.: US 9,588,798 B2
(45) Date of Patent: Mar. 7, 2017

(54) SOFTWARE SAFE SHUTDOWN SYSTEM, SOFTWARE SAFE SHUTDOWN METHOD, AND PROGRAM TO PREVENT A PROBLEM CAUSED BY A SYSTEM FAILURE

(71) Applicant: NEC Corporation, Minato-ku, Tokyo (JP)

(72) Inventor: Fumio Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/766,912

(22) PCT Filed: Aug. 26, 2013

(86) PCT No.: PCT/JP2013/072741
§ 371 (c)(1),
(2) Date: Aug. 10, 2015

(87) PCT Pub. No.: WO2014/132466
PCT Pub. Date: Sep. 4, 2014

(65) Prior Publication Data
US 2016/0011899 A1    Jan. 14, 2016

(30) Foreign Application Priority Data
Feb. 28, 2013  (JP) .................... 2013-039061

(51) Int. Cl.
*G06F 9/455*    (2006.01)
*G06F 11/00*    (2006.01)
(Continued)

(52) U.S. Cl.
CPC .......... *G06F 9/45558* (2013.01); *G06F 9/442* (2013.01); *G06F 11/0712* (2013.01);
(Continued)

(58) Field of Classification Search
None
See application file for complete search history.

(56) References Cited

U.S. PATENT DOCUMENTS 7,478,387 B2 * 1/2009 Abelite ............... G06F 11/1438
714/E11.137
7,865,893 B1 * 1/2011 Omelyanchuk ..... G06F 11/3644
710/1

FOREIGN PATENT DOCUMENTS

JP    2001-101034 A    4/2001
JP    2004-213122 A    7/2004
(Continued)

OTHER PUBLICATIONS

International Search Report for PCT Application No. PCT/JP2013/072741, mailed on Nov. 19, 2013.
(Continued)

*Primary Examiner* — Meng An
*Assistant Examiner* — Bing Zhao

(57) ABSTRACT

Provided is a software safe shutdown system, comprising: an OS anomalous shutdown detection unit, which detects that an operating system of a virtual machine which is executed by a computer system has had an anomalous shutdown due to a memory leak; a memory resource securing unit which secures, from among a usable memory resource within the computer system, a memory resource which is necessary to recover a console function of the anomalously shutdown virtual machine; and a console acquisition unit which allocates the secured memory resource to the anomalously shutdown virtual machine, and which, after recovering the console function, normally shuts down the virtual machine using the console function.

7 Claims, 5 Drawing Sheets

(51) Int. Cl.
*G06F 11/14* (2006.01)
*G06F 11/07* (2006.01)
*G06F 9/44* (2006.01)

(52) U.S. Cl.
CPC ...... *G06F 11/0793* (2013.01); *G06F 11/1438* (2013.01); *G06F 2009/45575* (2013.01); *G06F 2009/45583* (2013.01); *G06F 2201/805* (2013.01)

(56) References Cited

FOREIGN PATENT DOCUMENTS

| JP | 2004-252591 A | 9/2004 |
| JP | 2007-133544 A | 5/2007 |
| JP | 2008-003770 A | 1/2008 |
| JP | 2011-128967 A | 6/2011 |
| JP | 2012-185865 A | 9/2012 |

OTHER PUBLICATIONS

English translation of Written opinion for PCT Application No. PCT/JP2013/072741.

* cited by examiner

SOFTWARE SAFE SHUTDOWN SYSTEM, SOFTWARE SAFE SHUTDOWN METHOD, AND PROGRAM TO PREVENT A PROBLEM CAUSED BY A SYSTEM FAILURE

This application is a National Stage Entry of PCT/JP2013/072741 filed on Aug. 26, 2013, which claims priority from Japanese Patent Application 2013-039061 filed on Feb. 28, 2013, the contents of all of which are incorporated herein by reference, in their entirety.

TECHNICAL FIELD

The present invention relates to a software safe shutdown system, a software safe shutdown method, and a program.

BACKGROUND ART

A memory leak is one of examples of system failure caused by a defect in software. A memory leak is a phenomenon in which an allocated memory for software objects or data is not released properly and a system shuts down due to exhaustion of a free area in the memory. In a general computer system, the memory is managed by an operating system (OS) and shared by a plurality of pieces of software. Thus, a defect in a piece of software sometimes causes a shutdown of the whole of the OS.

Recovering an OS which has shut down due to a memory leak requires a reboot of the computer system. In other words, it is required to turn off the computer system and boot the computer system again. In a case of a virtual machine achieved with a server virtualization function, it is required to remove a virtual machine which has shut down anomalously and newly generate a virtual machine again. In recovering an OS through reboot or regeneration, data not saved in a persistent storage, such as a hard disk, at the anomalous shutdown are deleted. In other words, data held in a non-persistent storage, such as a cache and a buffer, are deleted. As a consequence, not only data important for users but also information which becomes a clue to identify a cause of the anomalous shutdown are lost. Further, turning off the computer system which is in an anomalous condition causes inconsistency in data referenced by the software and sometimes makes it impossible to boot the computer system normally at reboot.

As described above, since such troubles are caused once a memory leak takes place, a method to avoid an occurrence of a memory leak in advance is employed in general.

A mobile terminal disclosed in PTL 1 monitors the operational status of an operating system at a constant time interval, and, when it is predicted that the operating system has become unstable due to a destabilizing factor, such as a memory leak, carries out a predetermined workaround corresponding to the predicted unstable condition. The mobile terminal disclosed in PTL 1 avoids an occurrence of a failure beforehand by carrying out such a measure.

CITATION LIST

Patent Literature

PTL 1: Japanese Unexamined Patent Application Publication No. 2008-003770

SUMMARY OF INVENTION

Technical Problem

However, by the mobile terminal disclosed in PTL 1, it has not been possible to prevent a trouble from being caused when a system failure actually takes place due to a memory leak.

Accordingly, an object of the present invention is to prevent a trouble from being caused when a system failure takes place due to a memory leak.

Solution to Problem

A software safe shutdown system according to the present invention includes an OS anomalous shutdown detection unit configured to detect that an operating system of a virtual machine, which is executed by a computer system, has had an anomalous shutdown due to a memory leak, a memory resource securing unit configured to secure a memory resource required for recovering a console function of the anomalously shutdown virtual machine from within a memory resource available in the computer system, and a console acquisition unit configured to allocate the secured memory resource to the anomalously shutdown virtual machine and, after the console function has been recovered, normally shut down the virtual machine by using the console function.

Advantageous Effects of Invention

According to the present invention, it is possible to prevent a trouble from being caused when a system failure takes place due to a memory leak.

DESCRIPTION OF EMBODIMENTS

First Exemplary Embodiment

Exemplary embodiments which embody the present invention will be described in detail with reference to the accompanying drawings.

Figure 1:
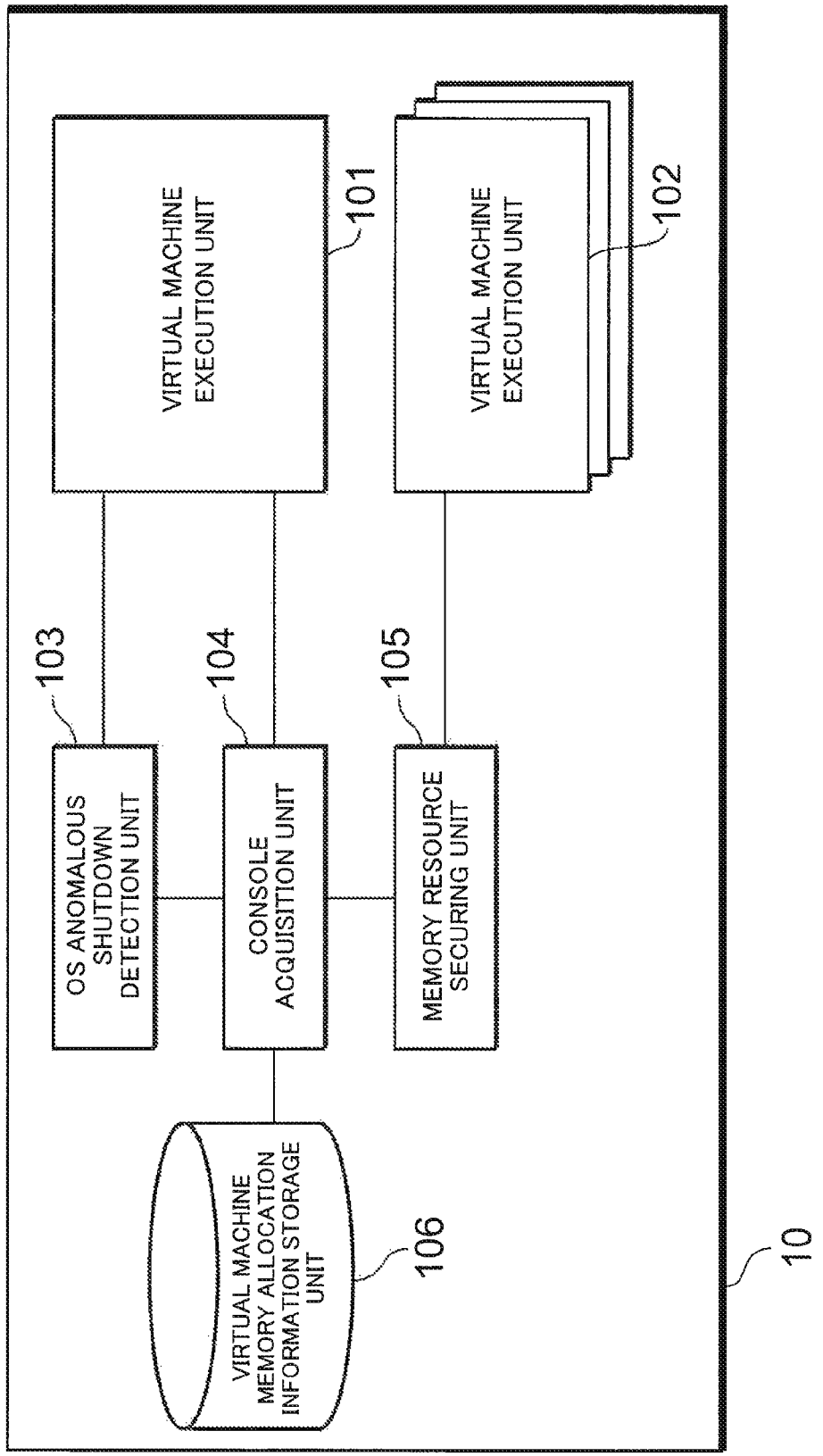
FIG. 1 is a block diagram illustrating a configuration of a software safe shutdown system according to a first exemplary embodiment of the present invention.

FIG. 1 is a block diagram illustrating a configuration of a software safe shutdown system 10 according to a first exemplary embodiment of the present invention. As illustrated in FIG. 1, the software safe shutdown system 10 includes virtual machine execution units 101 and 102, an OS anomalous shutdown detection unit 103, a console acquisition unit 104, a memory resource securing unit 105, and a virtual machine memory allocation information storage unit 106.

The software safe shutdown system 10 is configurable with a dedicated or general purpose computer which has a CPU (Central Processing Unit), a memory such as a ROM (Read Only Memory) and a RAM (Random Access Memory), an external storage device which stores various information, an input interface, an output interface, a communication interface, and a bus which links these components. The software safe shutdown system 10 may be configured with a single computer or a plurality of computers which are interconnected via a communication line.

The virtual machine execution units 101 and 102, the OS anomalous shutdown detection unit 103, the console acquisition unit 104, and the memory resource securing unit 105 correspond to functional modules which are achieved by the CPU executing predetermined programs stored in the ROM or the like. The virtual machine memory allocation information storage unit 106 is implemented by the external storage device. The external storage device may be connected to the software safe shutdown system 10 via a network or the like.

Each of the virtual machine execution units 101 and 102 provides an OS of a virtual machine with an execution environment.

The OS anomalous shutdown detection unit 103 detects a memory leak taking place in the virtual machine execution unit 101.

The console acquisition unit 104 allocates an additional memory to the virtual machine execution unit 101 which has shut down anomalously. The console acquisition unit 104, when a console function of the virtual machine execution unit 101 is recovered by adding a memory, carries out data saving, log recording, and action to remove an anomalous condition of software by using the console and makes the virtual machine shut down normally.

The memory resource securing unit 105 secures a memory resource required for acquiring a console function of the virtual machine execution unit 101 from within an available memory resource in the software safe shutdown system 10.

The virtual machine memory allocation information storage unit 106 stores the amounts of memory resources individually allocated to the virtual machine execution units 101 and 102.

Figure 2:
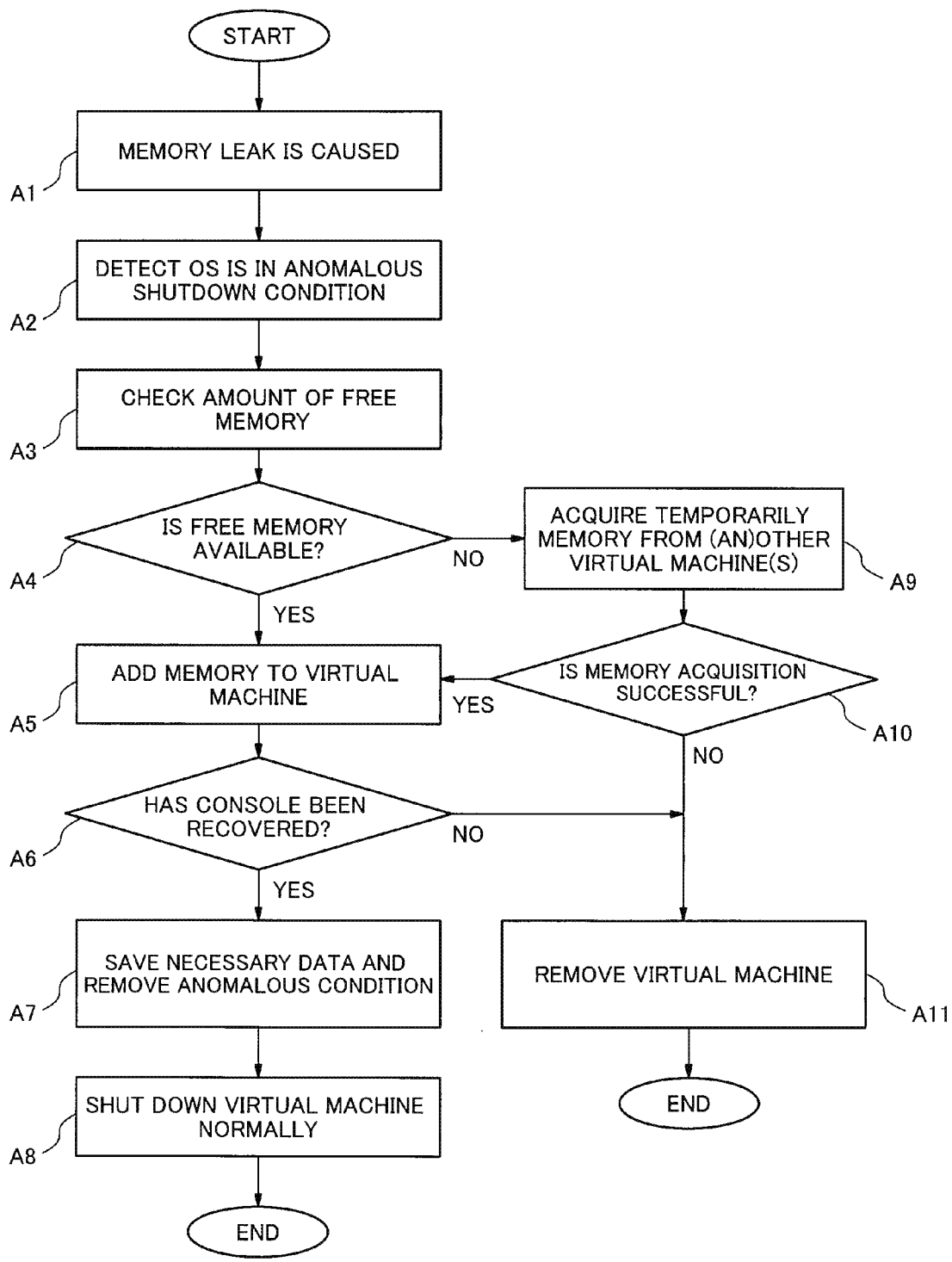
FIG. 2 is a flowchart of an operation of the software safe shutdown system according to the first exemplary embodiment of the present invention.

Next, an operation of the software safe shutdown system 10 will be described. FIG. 2 is a flowchart of an operation of the software safe shutdown system 10.

A failure caused by a memory leak takes place in a virtual machine due to a defect of software being executed in the virtual machine execution unit 101 (step A1).

When a failure takes place in the virtual machine execution unit 101, the OS anomalous shutdown detection unit 103 detects an anomalous shutdown condition of the virtual machine execution unit 101 (step A2). The OS anomalous shutdown detection unit 103 always monitors the alive-or-dead state of the OS to detect an anomalous shutdown condition of the virtual machine execution unit 101.

When the virtual machine execution unit 101 is in an anomalous shutdown condition, the OS in the virtual machine is inaccessible by using a console. The memory resource securing unit 105 checks whether or not a required amount of free memory for recovery of a console function of the virtual machine execution unit 101 is available in the software safe shutdown system 10 (step A3). When a usable free memory is available (YES in step A4), the console acquisition unit 104 adds the required amount of memory to the virtual machine execution unit 101 (step A5).

When a console function of the virtual machine execution unit 101 is recovered by the additional memory allocation (YES in step A6), the console acquisition unit 104 carries out data saving, log recording, and an action to remove an anomalous condition of the software by using the console (step A7) and makes the virtual machine shut down normally (step A8).

On the other hand, no free memory allocatable to the virtual machine execution unit 101 is available (NO in step A4), the memory resource securing unit 105 attempts to make use of a memory which has been allocated to the virtual machine execution unit 102 (step A9). When a memory is acquired from the virtual machine execution unit 102 (YES in step A10), the memory resource securing unit 105 attempts to recover a console function by adding the memory to the virtual machine execution unit 101 (step A5).

When the memory resource securing unit 105 is unable to acquire a memory from another virtual machine execution unit 102 (NO in step A10) or a console function of the virtual machine execution unit 101 is not recovered even if a memory is added (NO in step A6), the console acquisition unit 104 removes the virtual machine execution unit 101 and ends the operation (step A11).

As described thus far, according to the first exemplary embodiment, the software safe shutdown system 10 acquires a console by allocating an additional memory to a virtual machine which has anomalously shut down due to a memory leak. Thus, the software safe shutdown system 10 is capable of shutting down the virtual machine normally by using the acquired console.

Since the software safe shutdown system 10 normally shuts down a virtual machine which has anomalously shut down without removing the virtual machine, the software safe shutdown system 10 is capable of first storing data, which had been stored in a non-persistent storage before the anomalous shutdown, in a persistent storage and then shutting down the virtual machine. Thus, it is possible to prevent data which have been stored in a non-persistent storage from being deleted because of removal of a virtual machine.

Since the software safe shutdown system 10 is capable of preventing information on actions and states having been taken by the system before an anomalous shutdown from being lost because of removal of a virtual machine, it is possible to achieve a speed-up in investigating the cause of and solving a problem in the anomalous shutdown.

The software safe shutdown system 10 is capable of preventing inconsistency from being caused in data used by the software because of removal of a virtual machine.

Since, in the first exemplary embodiment, when the software safe shutdown system 10 does not have enough memory to be allocated to a virtual machine which has shut down anomalously, the software safe shutdown system 10 is configured to make use of a memory resource allocated to another virtual machine, the software safe shutdown system 10 is capable of safely shutting down the virtual machine which has shut down anomalously without preparing a surplus memory resource in advance.

Second Exemplary Embodiment

Figure 3:
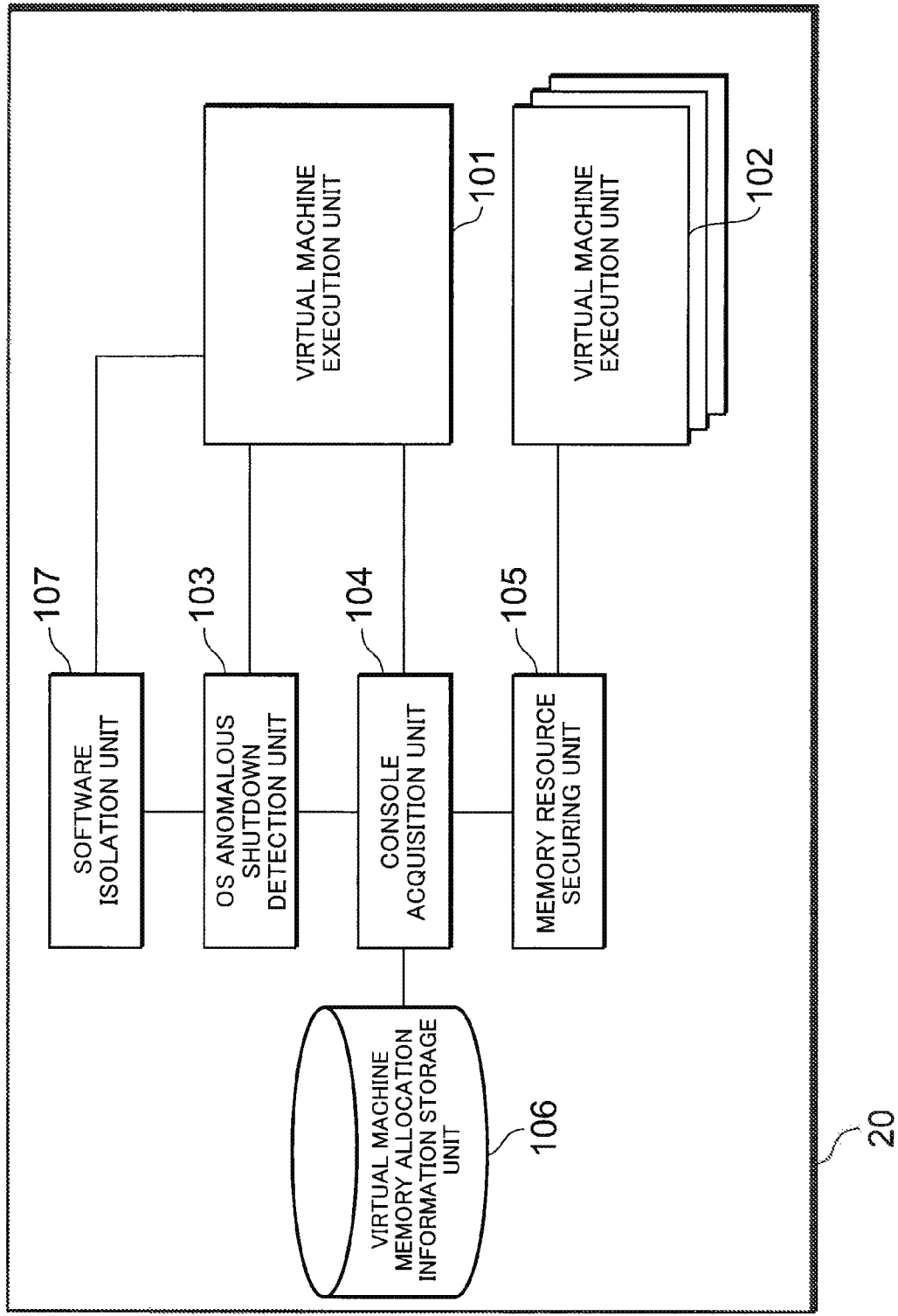
FIG. 3 is a block diagram illustrating a configuration of a software safe shutdown system according to a second exemplary embodiment of the present invention.

FIG. 3 is a block diagram illustrating a configuration of a software safe shutdown system 20 according to a second exemplary embodiment of the present invention. Components having the same signs as those in FIG. 1 are identical or equivalent components. As illustrated in FIG. 3, the software safe shutdown system 20 according to the second exemplary embodiment of the present invention includes, in addition to the configuration in the first exemplary embodiment, a software isolation unit 107. The software isolation unit 107 isolates software, which is executed by using the virtual machine execution unit 101 and may be a cause of a memory leak, from other software.

Next, with reference to FIG. 2, an operation of the software safe shutdown system 20 will be described. When an anomalous shutdown condition of an OS is detected in step A2, the software isolation unit 107 carries out processing to isolate software which has caused a memory leak from other software having been executed in the virtual machine execution unit 101 and an associated component(s) existing outside the software safe shutdown system 10.

The contents of the processing differ in accordance with the configuration of the software which has caused a memory leak. For example, when the software has a configuration of a load balancing cluster, the software isolation unit 107 isolates the software from the other component(s) by excluding the software from targets of the load balancing cluster.

When the software communicates with other software, which operates on another computer, by using a networking function, the software isolation unit 107, by invalidating a network interface of the virtual machine execution unit 101, isolates the software from the network. In this way, the software isolation unit 107 isolates software having caused a memory leak and reduces a failure risk in allocating an additional memory and, then, the process proceeds to step A3. Operations thereafter are the same as those in the first exemplary embodiment.

As described thus far, according to the second exemplary embodiment, since the software safe shutdown system 20 is configured to attempt to acquire a console after isolating software having caused a memory leak from other software, it is possible to reduce a risk of causing another failure due to a memory leak after allocating an additional memory and shut down a virtual machine more safely.

Third Exemplary Embodiment

Figure 4:
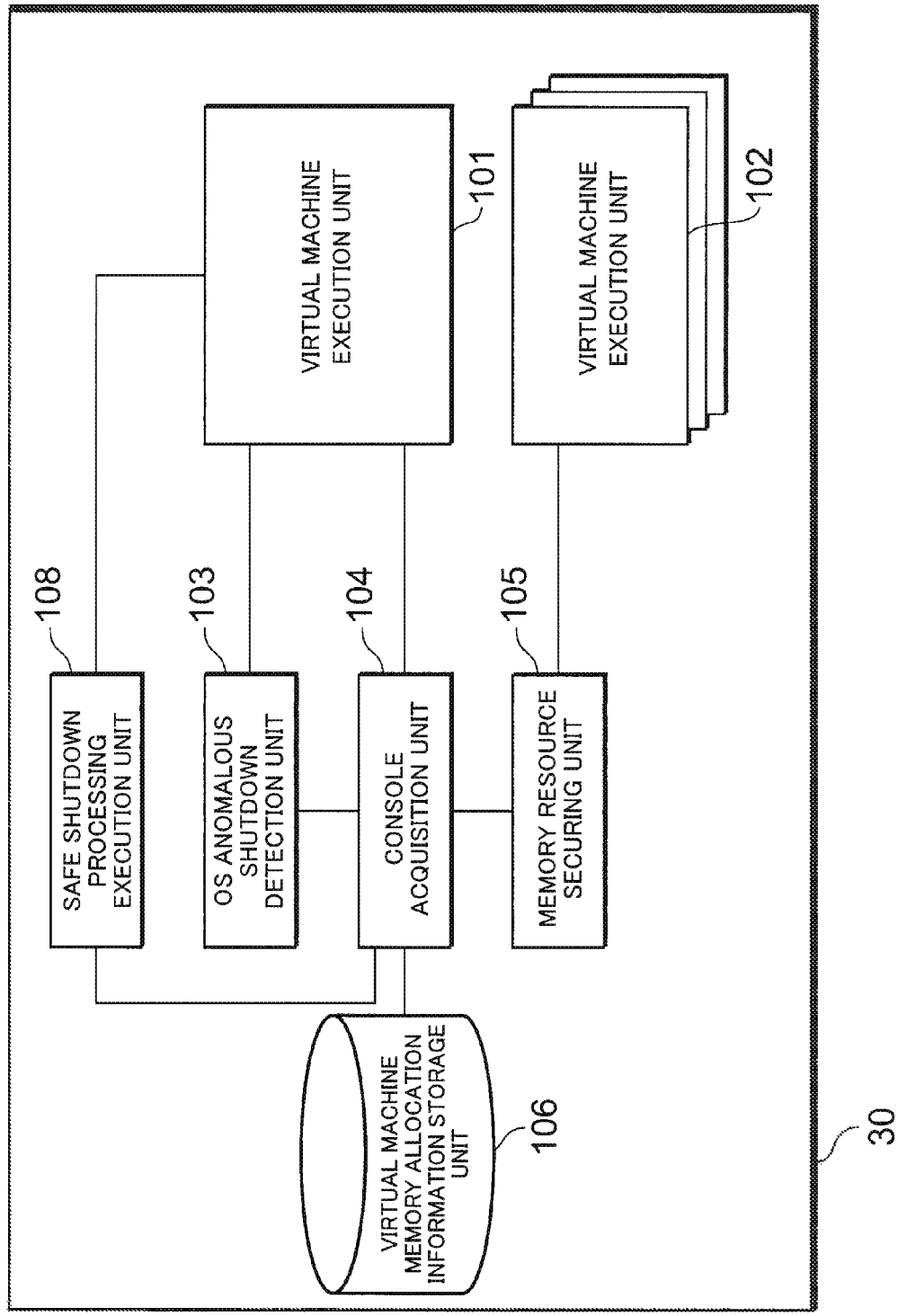
FIG. 4 is a block diagram illustrating a configuration of a software safe shutdown system according to a third exemplary embodiment of the present invention.

FIG. 4 is a block diagram illustrating a configuration of a software safe shutdown system 30 according to a third exemplary embodiment of the present invention. Components having the same signs as those in FIG. 1 are identical or equivalent components. As illustrated in FIG. 4, the software safe shutdown system 30 according to the third exemplary embodiment of the present invention includes, in addition to the configuration of the first exemplary embodiment, a safe shutdown processing execution unit 108. The safe shutdown processing execution unit 108, when a console function is acquired by a console acquisition unit 104, automatically carries out processing to collect information required for investigating the cause of a failure and store important data used by software and shuts down a virtual machine safely.

Next, with reference to FIG. 2, an operation of the software safe shutdown system 30 will be described. When a console function is acquired by the console acquisition unit 104 in step A6, the safe shutdown processing execution unit 108 downloads a script which automatically executes processing required for a safe shutdown of a virtual machine execution unit 101, executes the downloaded script at a priority higher than the other program(s), shuts down the software safely, and ends the operation. The processing automatically executed by the safe shutdown processing execution unit 108 includes removal of an anomalous condition of the software, elimination of data inconsistency, storage of temporary data, collection of information on the behavior of the system immediately before an anomalous shutdown, log recording, normal shutdown processing of processes, and so on.

As described thus far, according to the third exemplary embodiment, the software safe shutdown system 30, when a console function is acquired by allocating an additional memory to the virtual machine having shut down anomalously, automatically executes a program to shut down software safely. With this configuration, it is possible to reduce a cost of manual recovery processing and a risk of an operational error and shut down a virtual machine safely in a shorter time.

EXAMPLE

Next, an example of the present invention will be described in detail with reference to the accompanying drawings.

Figure 5:
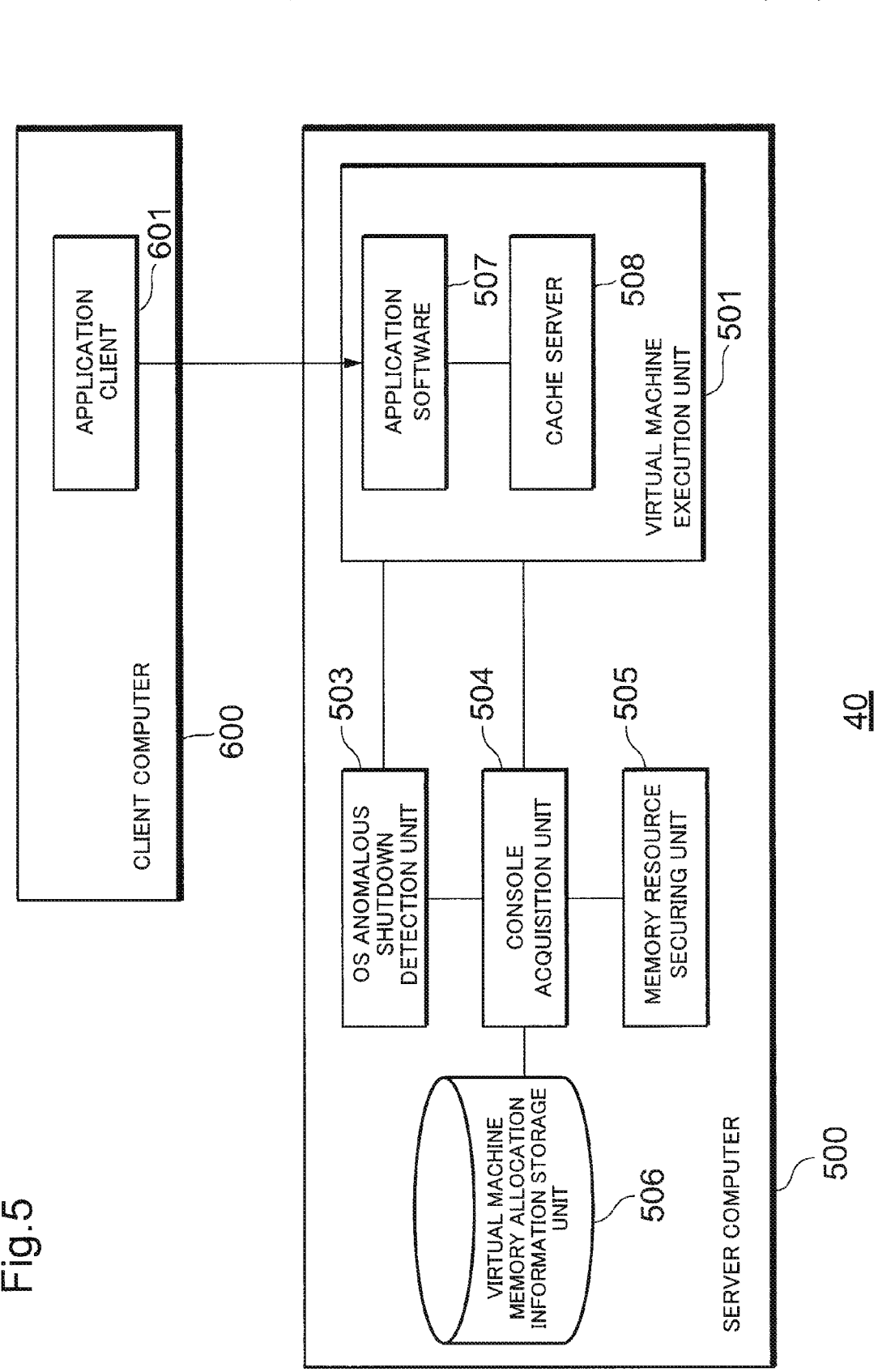
FIG. 5 is a block diagram illustrating a configuration of a software safe shutdown system according to an example of the present invention.

FIG. 5 is a block diagram illustrating a configuration of a software safe shutdown system 40 according to the example of the present invention. As illustrated in FIG. 5, the software safe shutdown system 40 includes a server computer 500 and a client computer 600.

The server computer 500 includes a virtual machine execution unit 501, an OS anomalous shutdown detection unit 503, a console acquisition unit 504, a memory resource securing unit 505, and a virtual machine memory allocation information storage unit 506. The virtual machine execution unit 501 includes application software 507 and a cache server 508.

The client computer 600 includes an application client 601. The application client 601 accesses the application software 507 by network communication and requests execution of processing. The application software 507 is, for example, a Web application system using HTTP (Hypertext Transfer Protocol) communication or the like. The application client 601 may receive processing from a plurality of different client computers.

The application software 507 executes processing requested by the application client 601 and stores data in the cache server 508 in the processing. The cache server 508 stores data used by the application software 507 in a memory thereof. Data stored in the cache server 508 have a data structure composed of a pair of a key and a value (for example, hash table). The application client 601 is able to request reading and writing of data by specifying a key.

The cache server 508 functions as a portion of the application software 507 and is booted by the application software 507. The application software 507 sets, at boot up, an upper limit for the amount of data which may be stored in the cache server 508. The upper limit is kept within a range of the amount of memory which is available to the virtual machine execution unit 501.

An operation of the software safe shutdown system 40 will be described below when an upper limit is not set properly for the memory used by the cache server 508 because of a defect of the application software 507.

For example, when an amount which is substantially greater than the amount of memory allocated to the virtual machine execution unit 501 is set as an upper limit for a memory used by the cache server 508, the cache server 508 attempts to store, in the memory, data the amount of which surpasses the amount of memory available to the virtual machine execution unit 501. Thus, when the amount of processing requested by the application client 601 surpasses a predetermined amount, a problem of memory leak is caused.

When a memory leak takes place in the cache server 508, the application software 507 and an OS running in the virtual machine execution unit 501 shut down anomalously. Under such a condition, a console of the virtual machine execution unit 501 becomes inaccessible, and the virtual machine execution unit 501 also becomes inaccessible via the network. Thus, errors are returned to all processing requests from the application client 601. In such a case, no recovery means other than removing and regenerating the virtual machine execution unit 501 has been applicable so far.

In the example, when a memory leak as described above takes place, the OS anomalous shutdown detection unit 503 detects the memory leak, and the memory resource securing unit 505 checks a memory resource which is available on the server computer 500. When a surplus memory resource is found on the server computer 500, the console acquisition unit 504 allocates the memory resource to the virtual machine execution unit 501. With this operation, a portion of processes which had been executed in the virtual machine execution unit 501 are recovered, and the console function becomes accessible.

There is a case in which functions of the application software 507 and the cache server 508 are also recovered. However, since, in general, a process crashes due to an anomalous shutdown and the virtual machine execution unit 501 is forcibly shut down before an anomalous shutdown of the OS, it is not assured that all functions are recovered. However, recovering the console function makes it possible to save contents stored in the cache server 508 and collect log information before the anomalous shutdown. It also becomes possible to remove an inconsistent condition at the anomalous shutdown and safely shut down the cache server 508, the application software 507, and the OS individually through respective normal shutdown procedures.

This application claims priority based on Japanese Patent Application No. 2013-39061, filed on Feb. 28, 2013, the entire disclosure of which is incorporated herein by reference.

Although the present invention was described above through exemplary embodiments thereof, the present invention is not limited to the above exemplary embodiments. Various modifications that could be understood by a person skilled in the art may be applied to the configurations and details of the present invention within the scope of the present invention.

All or part of the exemplary embodiments described above may be described as in the following supplementary notes, but the present invention is not limited thereto.

(Supplementary note 1) A software safe shutdown system, including:

an OS anomalous shutdown detection unit which detects that an operating system of a virtual machine, which is executed by a computer system, has had an anomalous shutdown due to a memory leak;

a memory resource securing unit which secures a memory resource required for recovering a console function of the anomalously shutdown virtual machine from within a memory resource available in the computer system; and a console acquisition unit which allocates the secured memory resource to the anomalously shutdown virtual machine and, after the console function has been recovered, normally shut down the virtual machine by using the console function.

(Supplementary note 2) The software safe shutdown system according to Supplementary note 1, wherein the memory resource securing unit secures a memory resource required for recovering a console function of the anomalously shutdown virtual machine from within a memory resource allocated to another virtual machine executed by the computer system.

(Supplementary note 3) The software safe shutdown system according to Supplementary note 1 or 2, further including:

a software isolation unit which isolates software which has caused the memory leak from other software executed in the virtual machine and an associated component existing outside the computer system.

(Supplementary note 4) The software safe shutdown system according to any one of Supplementary notes 1 to 3, further including:

a safe shutdown processing execution unit which automatically executes processing to normally shut down the virtual machine after the console function has been recovered.

(Supplementary note 5) The software safe shutdown system according to any one of Supplementary notes 1 to 4, wherein the safe shutdown processing execution unit automatically executes at least one of removal of an anomalous condition of software, elimination of data inconsistency, saving of temporary data, collection of information on behavior of the system immediately before an anomalous shutdown, log recording, and normal shutdown processing of processes.

(Supplementary note 6) A software safe shutdown method, including:

detecting that an operating system of a virtual machine, which is executed by a computer system, has had an anomalous shutdown due to a memory leak;

securing a memory resource required for recovering a console function of the anomalously shutdown virtual machine from within a memory resource available in the computer system; and allocating the secured memory resource to the anomalously shutdown virtual machine and, after the console function has been recovered, normally shutting down the virtual machine by using the console function.

(Supplementary note 7) A program which makes a computer function as:

an OS anomalous shutdown detection unit which detects that an operating system of a virtual machine, which is executed by a computer system, has had an anomalous shutdown due to a memory leak;

a memory resource securing unit which secures a memory resource required for recovering a console function of the anomalously shutdown virtual machine from within a memory resource available in the computer system; and a console acquisition unit which allocates the secured memory resource to the anomalously shutdown virtual machine and, after the console function has been recovered, normally shut down the virtual machine by using the console function.

INDUSTRIAL APPLICABILITY

The present invention is suitable for preventing a problem from taking place when a system failure due to a memory leak is caused in a virtual machine running on a computer system.

REFERENCE SIGNS LIST 10, 20, 30, 40 Software safe shutdown system
101, 102, 501 Virtual machine execution unit
103, 503 OS anomalous shutdown detection unit 104, 504 Console acquisition unit
105, 505 Memory resource securing unit
106, 506 Virtual machine memory allocation information storage unit
107 Software isolation unit
108 Safe shutdown processing execution unit
500 Server computer
507 Application software
508 Cache server
601 Application client
600 Client computer

What is claimed is:

1. A software safe shutdown system, comprising:
a memory configured to store program code;
a processor operable to read the program code from the memory and operate as instructed by the program code to implement:
an OS anomalous shutdown detection unit configured to detect that an operating system running inside a virtual machine, which is executed by a computer system, freezes due to a memory leak;
a memory resource allocation unit configured to allocate a memory resource required for recovering a console function of the frozen operating system running inside the virtual machine from a memory resource available in the computer system, in response to the detection of the frozen operating system; and
a console acquisition unit configured to assign the allocated memory resource to the frozen operating system running inside the virtual machine for recovering the console function of the operating system, and after the console function has been recovered, normally shut down the virtual machine by recovering an anomalous condition of software using the console function.

2. The software safe shutdown system according to claim 1,
wherein the memory resource allocating unit secures the memory resource required for recovering the console function of the frozen operating system running inside the virtual machine from a memory resource allocated to another virtual machine executed by the computer system.

3. The software safe shutdown system according to claim 1, further comprising:
a software isolation unit configured to isolate software which has caused the memory leak from other software executed in the virtual machine and an associated component existing outside the computer system.

4. The software safe shutdown system according to claim 1, further comprising:
a safe shutdown processing execution unit which automatically executes processing to normally shut down the virtual machine after the console function has been recovered.

5. The software safe shutdown system according to claim 4,
wherein the safe shutdown processing execution unit automatically executes at least one of removal of an anomalous condition of software, elimination of data inconsistency, saving of temporary data, collection of information on behavior of the system immediately before an anomalous shutdown, log recording, and normal shutdown processing of processes.

6. A software safe shutdown method, comprising:
detecting that an operating system running inside a virtual machine, which is executed by a computer system, freezes due to a memory leak;
allocating a memory resource required for recovering a console function of the frozen operating system running inside the virtual machine from a memory resource available in the computer system, in response to the detection of the frozen operating system; and
assigning the allocated memory resource to the frozen operating system running inside the virtual machine for recovering the console function of the operating system, and after the console function has been recovered, normally shutting down the virtual machine by removing an anomalous condition of software using console function.

7. A non-transitory computer readable storage medium recording thereon a program, causing a computer to function as:
an OS anomalous shutdown detection unit configured to detect that an operating system running inside a virtual machine, which is executed by a computer system, freezes due to a memory leak;
a memory resource allocation unit configured to allocate a memory resource required for recovering a console function of the frozen operating system running inside the virtual machine from a memory resource available in the computer system, in response to the detection of the frozen operating system; and
a console acquisition unit configured to assign the allocated memory resource to the frozen operating system running inside the virtual machine for recovering the console function of the operating system, and after the console function has been recovered, normally shut down the virtual machine by removing an anomalous condition of software using the console function.

* * * * *